US008879701B2

(12) United States Patent
Phadnis et al.

(10) Patent No.: US 8,879,701 B2
(45) Date of Patent: Nov. 4, 2014

(54) MULTIPLE LANGUAGE SUPPORT IN TELECOMMUNICATION SYSTEMS

(75) Inventors: Mohan Vinayak Phadnis, Pune (IN); Sreekanth Subrahmanya Nemani, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/447,254

(22) Filed: Apr. 15, 2012

(65) Prior Publication Data
US 2013/0272513 A1 Oct. 17, 2013

(51) Int. Cl.
*H04M 1/57* (2006.01)

(52) U.S. Cl.
USPC ............ 379/142.04; 379/142.01; 379/142.17; 379/202.01; 704/2; 704/3; 704/4

(58) Field of Classification Search
USPC ........ 379/88.05, 88.06, 45, 52, 142; 704/3, 8; 709/206, 207
See application file for complete search history.

(56) References Cited

U.S. PATENT DOCUMENTS

| 5,701,497 | A  | * | 12/1997 | Yamauchi et al. | 704/3 |
|---|---|---|---|---|---|
| 7,039,172 | B2 |   | 5/2006  | Wrobel          |       |
| 2003/0135569 | A1 | * | 7/2003  | Khakoo et al. | 709/206 |
| 2003/0215074 | A1 | * | 11/2003 | Wrobel | 379/142.04 |
| 2007/0041540 | A1 | * | 2/2007  | Shao et al. | 379/142.01 |
| 2007/0168450 | A1 | * | 7/2007  | Prajapat et al. | 709/207 |
| 2009/0076793 | A1 | * | 3/2009  | Hoefelmeyer et al. | 704/3 |
| 2009/0089043 | A1 | * | 4/2009  | Rao et al. | 704/8 |
| 2010/0248759 | A1 | * | 9/2010  | Bettis et al. | 455/466 |

OTHER PUBLICATIONS

RFC 3282 "Content Language Headers" Alvestrand, Cisco Systems, May 2002, 8 pgs.

* cited by examiner

*Primary Examiner* — Joseph J Nguyen
(74) *Attorney, Agent, or Firm* — IP Spring

(57) ABSTRACT

Embodiments provide caller information in multiple languages to multiple receiving communication devices. In one embodiment, the method includes receiving a call request from a sending endpoint communication device connected to a network. Caller identification information associated with the call request is obtained, where the caller identification information includes one or more identifications associated with the sending endpoint communication device. Each identification specifies the same content in a different language. The call request and at least one of the identifications are transmitted over the network to be received by receiving endpoint communication devices connected to the network. Each receiving endpoint communication device can output at least one of the received identifications specified in a language designated for use by that receiving endpoint communication device.

3 Claims, 5 Drawing Sheets

MULTIPLE LANGUAGE SUPPORT IN TELECOMMUNICATION SYSTEMS

TECHNICAL FIELD

Embodiments of the disclosure relate generally to telecommunication systems and more specifically to enabling language support in telecommunication systems.

BACKGROUND

Internet protocol (IP) telephony employs several protocols to setup and manage calls and other types of sessions. One of the most widely adopted protocols for IP-based signaling is the Session Initiation Protocol (SIP). SIP is used for initiating new calls, manipulating call paths, and enabling the association of services with users regardless of their point of connection in the network. For example, SIP allows call forking, in which a single call can ring many endpoints at the same time. The use of SIP as an interface assures that clients and servers in an IP telecommunication system can rely on a common and widely used method for exchanging information.

The increasing use of SIP has spurred the development and introduction of numerous features using SIP interfaces for user and network access. For example, caller identification is one feature of SIP that can provide information about a caller to each device receiving a call request, allowing users receiving an incoming call to learn the identity of the caller before answering the call.

SUMMARY

Embodiments of the present disclosure relate to providing caller identification information in multiple languages to receiving communication devices. In one embodiment, the method includes receiving a call request from a sending endpoint communication device connected to a network. Caller identification information associated with the call request is obtained, where the caller identification information includes one or more identifications associated with the sending endpoint communication device. Each identification specifies the same content in a different language. The call request and at least one of the identifications are transmitted over the network to be received by multiple receiving endpoint communication devices connected to the network. Each receiving endpoint communication device can output at least one of the received identifications specified in a language designated for use by that receiving device, such as displaying an identification to a user.

In another embodiment, a device for providing caller information to communication devices includes a memory and at least one processor operative to access the memory and perform operations including receiving a call request from a sending endpoint communication device connected to a network, and obtaining caller identification information associated with the call request, the information including one or more identifications associated with the sending endpoint communication device. Each identification specifies the same content in a different language. The processor is operative to transmit the call request and at least one of the identifications over the network to be received by multiple receiving endpoint communication devices connected to the network. Each receiving endpoint communication device outputs at least one of the received identifications specified in a language designated for use by that receiving endpoint communication device.

In another embodiment, a method for communicating caller information for communication devices includes receiving a call request at a receiving endpoint communication device from a sending endpoint communication device connected to a network, where the receiving endpoint communication device receives the call request on a forked configuration of the network in which multiple receiving endpoint communication devices receive the call request at about the same time. Caller identification information associated with the sending endpoint communication device is received and includes multiple identifications. Each identification specifies the same content in a different language. At least one of the identifications is caused to be output to a user of the receiving endpoint communication device.

In another embodiment, a method for providing call information to communication devices includes receiving a call request from a sending endpoint communication device connected to a network. Caller identification information associated with the call request is selected. The caller identification information includes one or more identifications associated with the sending endpoint communication device, each identification specifying the same content in a different language. Each of the languages is determined for use by one or more receiving endpoint communication devices connected to the network, and the determined languages are based on information in the call request. The call request and at least one of the identifications are transmitted over the network to be received by the one or more receiving endpoint communication devices. Each receiving endpoint communication device outputs at least one of the received identifications specified in the language determined for use by that receiving endpoint communication device.

DETAILED DESCRIPTION

Various embodiments described herein support sending caller identification (ID) information in different languages to multiple called devices. Some embodiments can also similarly provide additional information items in different languages with the caller ID information. Each receiving user can view the caller ID information at the user's device before the user needs to answer the call. In some embodiments, a call can use a "forked configuration" or similar configuration in which a call request is sent from a sending endpoint communication device to multiple receiving endpoint communication devices. For example, the forked configuration allows the call to ring multiple endpoint devices at the same time or about the same time. The caller identification information is specified in multiple languages. Each receiving endpoint device outputs received caller ID information in a language appropriate or designated for use by that receiving device.

These features allow one or more receiving parties invited to a call by a call request to see caller identification information at their devices in a particular language appropriate for each receiving party.

Figure 1:
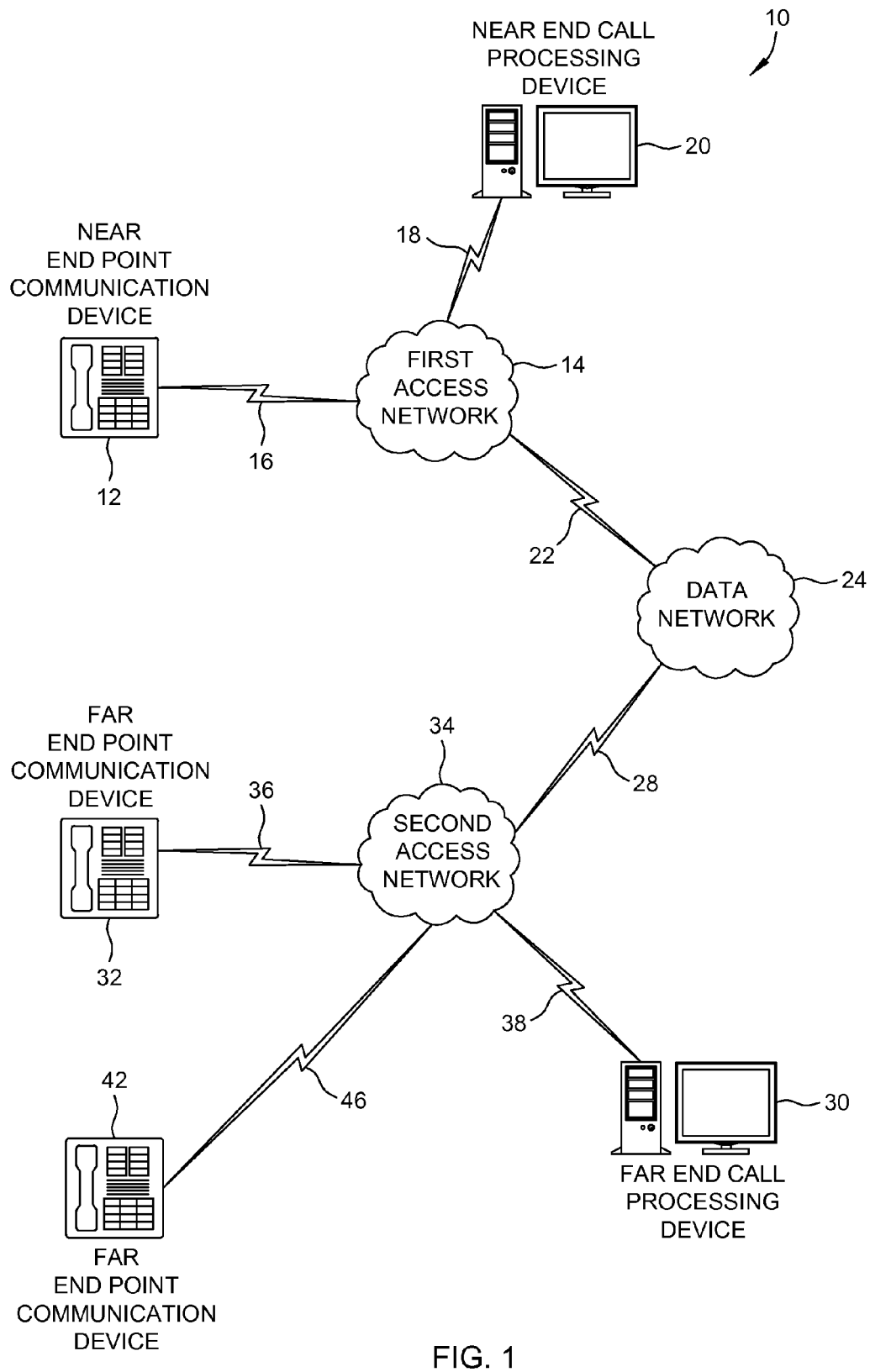
FIG. 1 is a block diagram depicting a telecommunication system suitable for use with embodiments disclosed herein.

FIG. 1 is a block diagram of an example telecommunication environment for use with embodiments described herein. In one embodiment, the system 10 includes a near endpoint communication device 12 communicatively linked to a first access network 14 through a link 16. A far endpoint communication device 32 is linked to a second access network 34 through a link 36. Network entities on the first access network 14 can communicate with network entities on the second access network 34 through a data network 24, such as the public Internet or other transport network. The first access network 14 and the second access network 34 are each connected to the data network 24 by links 22 and 28, respectively.

The first and second access networks 14 and 34 can be any type of network that connect communication devices 12, 32 and 42 to the data network 24. For example, the first and second access networks 14 and 34 can be wide area networks (WANs), local area networks (LANs), or others types of networks. In some embodiments, the networks 14 and 34 can be implemented in one or more of any type of communication network, including widely-used networks such as the Public Switched Telephone Network (PSTN), Internet Protocol (IP) Network, cell phone networks, etc.

In an embodiment, a near end call processing device 20 can be coupled to the near endpoint communication device 12 through the first access network 24. A far end call processing device 30 can be coupled to the far endpoint communication device 32 through second access network 34. In an example embodiment, the call processing devices 20 and 30 are call servers configured to perform routing of signaling requests and responses. Further, a second far endpoint communication device 42 can also be coupled to the far end call processing device 30 through the second access network 34 via link 46. In another embodiment, far endpoint communication device 42 can be coupled to a separate call processing device (not shown) through a separate data network as well. Additional far endpoint communication devices (not shown) can likewise be connected to the far end call processing device 30 through the second access network 34.

The links shown in system 10 can be hard-wired links, wireless links, or a combination thereof, and in some embodiments they can include intermediate network entities and/or networks. For example, the links 22 and 28 can include various configurations of gateways and/or routers. In another embodiment, the system 10 can also include other servers, such as registration servers, redirect servers, directory servers, and/or location servers. In an example embodiment, one or more of the server types can be provided as multiple devices or combined into one physical device.

In some embodiments, near endpoint communication device 12 and far endpoint communication devices 32 and 42 can be any devices that can communicate through the data network 24. In an example embodiment, the communication devices are network phones. In another embodiment, each communication device can be a computer or other electronic device running software to perform SIP user agent functions and including user interface hardware such as a microphone and/or headphones for communicating voice information with a user of the computer or device. Other user interfaces can also be used, such as interfaces using image or video data and/or other types of communication data, and can use wired or wireless communication techniques. In some embodiments, additional user agents can be included in the system 100, e.g., in additional devices of the system. In other embodiments, the endpoint devices can be standard telephones (e.g., land-line phones or cell phones) connected through a gateway or other connection allowing communication over the networks. Examples of the endpoint communication devices 12, 32, and 42 include mobile phones, desktop telephones, wireless handsets, Internet Protocol (IP) softphones, or any of a variety of other communication devices.

The near end call processing device 20 and the far end call processing device 30 can be intermediate devices that receive call requests from users using the endpoint devices 12, 32 and 42 and forward the call requests on users' behalf. A call request is a request from one endpoint device to another endpoint device to connect the devices in a call that allows communication between the endpoint devices. For example, the call request can be provided in an SIP message that includes particular headers and keywords indicating address of recipient, address of sender, type of call, etc. One example of an SIP call request is described below. Other protocols can include information elements or other structures to provide this information. In some example embodiments, the call processing devices 20 and/or 30 can act as proxy servers, including receiving SIP messages from the endpoint communication devices and forwarding them to another SIP server in the network over the data network 24. The SIP messages can be sent on a path eventually reaching a receiver or destination endpoint communication device. The call processing devices 20 and/or 30 can be used to provide functions such as authentication, authorization, location, proxy, registrar, network access control, routing, reliable request retransmission, security, gateways, and/or user agents. In relation to multiple language functionality described herein, one or both of the call processing devices 20 and 30 can obtain and process multiple language identifiers used in providing caller ID information, as described in various embodiments below. In one example, software on a near end call processing device 20 can obtain multiple language identifiers based on a received call request. In another example, software on a far end call processing device 30 can determine which of multiple received language identifiers is to be sent to and displayed at each far endpoint device 32 and 42.

In some embodiments, the system can use one call processing device or server to enable communication between endpoint devices. For example, some embodiments can enable call requests from the near endpoint device 12 to be forwarded by the near end call processing device 20 directly to the far endpoint devices 32 and 42 without using the far end call processing device 30. In one example, each far endpoint device 32 and 42 can include functionality (such as software) described above for some embodiments of a far end call processing device 30. In this example, this software on each far endpoint device 32 and 42 can allow that far endpoint device to determine and select which language identifier is to be displayed at that device from multiple received identifiers. In some embodiments, call requests and one or more language identifiers can be provided to far endpoint devices 32 and 42 using the far end call processing device 30 and without the use of the near end call processing device 20.

Furthermore, in some embodiments, the call processing devices 20 and/or 30 can be configured to act as forking proxies to provide a forked configuration, in which a single call request is provided to multiple endpoint devices. For example, the forked configuration can be created using bridging, call forwarding, and/or extension functions. In one example of an extension forked configuration, a call processing device 20 and/or 30 forwards an SIP message to both a desktop computer and to one or more portable devices such as mobile phones at endpoints. In a forked configuration, a call processing device can, for example, ring several phones at once until a user answers the call request and connects to the call.

In one example embodiment, a signaling protocol used in the system 10 is the Session Initiation Protocol (SIP). SIP is configured to set up Internet telephone calls, videoconferences, and other multimedia connections. SIP can establish two-party sessions (ordinary telephone calls), multiparty sessions (in which each party to the call can hear and speak), and multicast sessions (one sender, many receivers). The sessions can communicate audio, video, and/or data between the parties participating in the session. SIP handles call setup, call management, and call termination, while other protocols, such as real time protocol (RTP), are used for data transport. SIP is an application layer protocol and can be executed over the user datagram protocol (UDP) or the transport control protocol (TCP), for example. SIP, for example, is suitable for supporting a variety of services including providing caller identification information. SIP also supports forked configurations as part of its standard.

Other embodiments of system 10 can use other communication protocols that include appropriate functionality for caller ID and/or call requests as related to the multiple-language embodiments described herein. For example, the Integrated Services Digital Network (ISDN) standards for digital transmission include the International Telecommunication Union Telecommunication Standardization Sector (ITU-T) Recommendation Q.931 protocol for call signalling and connections. A message in ISDN includes a number of information elements for conveying information. Various caller ID information can be included in information elements such as calling party, calling party number, etc. Other protocols also can provide call requests to multiple receiving endpoint devices. In another example, the H.323 protocol uses call signalling based on the Q.931 protocol and can provide caller ID information similarly to the ISDN standard. Other protocols and standards can also be used with similar functionality.

According to embodiments described herein, caller ID information is provided to receiving devices in any of multiple different languages. Herein, a "language" can refer to any form of written language, whether the information is provided in a distinct language or dialect, and/or in different characters or character sets available for a language. As used herein, caller identification information and "identifications" can include any descriptive information about a caller, such as a caller's name, the calling number, the caller's address, the caller's designation or position, and/or other identification or descriptive information associated with the calling user and/or the sending (calling) endpoint device.

In operation, in an example embodiment, the near endpoint device 12 is configured to send a call request to the near end call processing device 20. The near end call processing device 20 is configured to obtain caller identification information including multiple identifications associated with the near endpoint device 12. Each identification specifies the same content in a different language. The near end call processing device 20 transmits the call request and at least one of the identifications over the network, for example in a forked configuration or other configuration allowing multiple receiving endpoint devices. This information is received by multiple receiving far endpoint devices 32 and 42. Each receiving far endpoint device outputs at least one of the identifications to its user in a language designated for use by that far endpoint device. Various embodiments of the operation of system 10 are described below.

Some of the described embodiments can use endpoint devices 12, 32, and/or 42 which have the software, hardware, or other modifications described herein to create and/or recognize the multiple-language identifiers. However, other embodiments may use one or more standard endpoint devices 12, 32, or 42 in a system 10 implementing the multiple language identifiers. These standard devices would not have to be modified to support the multiple-language caller ID functions. For example, a standard sending endpoint device can send a standard call request to a call processing device 20 and/or 30, and the call processing device can obtain and send other language identifier(s) to receiving endpoint devices 32 and 42 as described below. In some examples, the call processing device 20 and/or 30 can modify the call request by inserting the additional identifiers into the call request message, or provide one or more identifiers in separate messages. In some embodiments, multiple identifiers can be sent to receiving endpoint devices 32 and 42 that have been enabled to receive multiple language identifiers and select designed languages to output as described below.

In some embodiments, one or more of the receiving endpoint devices 32 and 42 can be similarly standard and unmodified with regard to the multiple-language features herein. For example, a call processing device 20 and/or 30 can determine the appropriate language identifier for each receiving endpoint device (e.g., based on predetermined stored information accessible to the call processing device, such as endpoint or user preference information provided by any of a user, administrator, endpoint device, etc.). The call processing device can send that identifier in a standard call request to each standard receiving endpoint device 32 and 42, as described below with reference to FIG. 4. In some embodiments, both sending 12 and receiving endpoint devices 32 and 42 can be standard endpoint devices that communicate using standard messages including standard caller IDs. This allows some embodiments in which the one or more call processing devices 20 and/or 30 are modified to use the multiple-language caller ID features described herein and the endpoint devices can remain unmodified.

Figure 2:
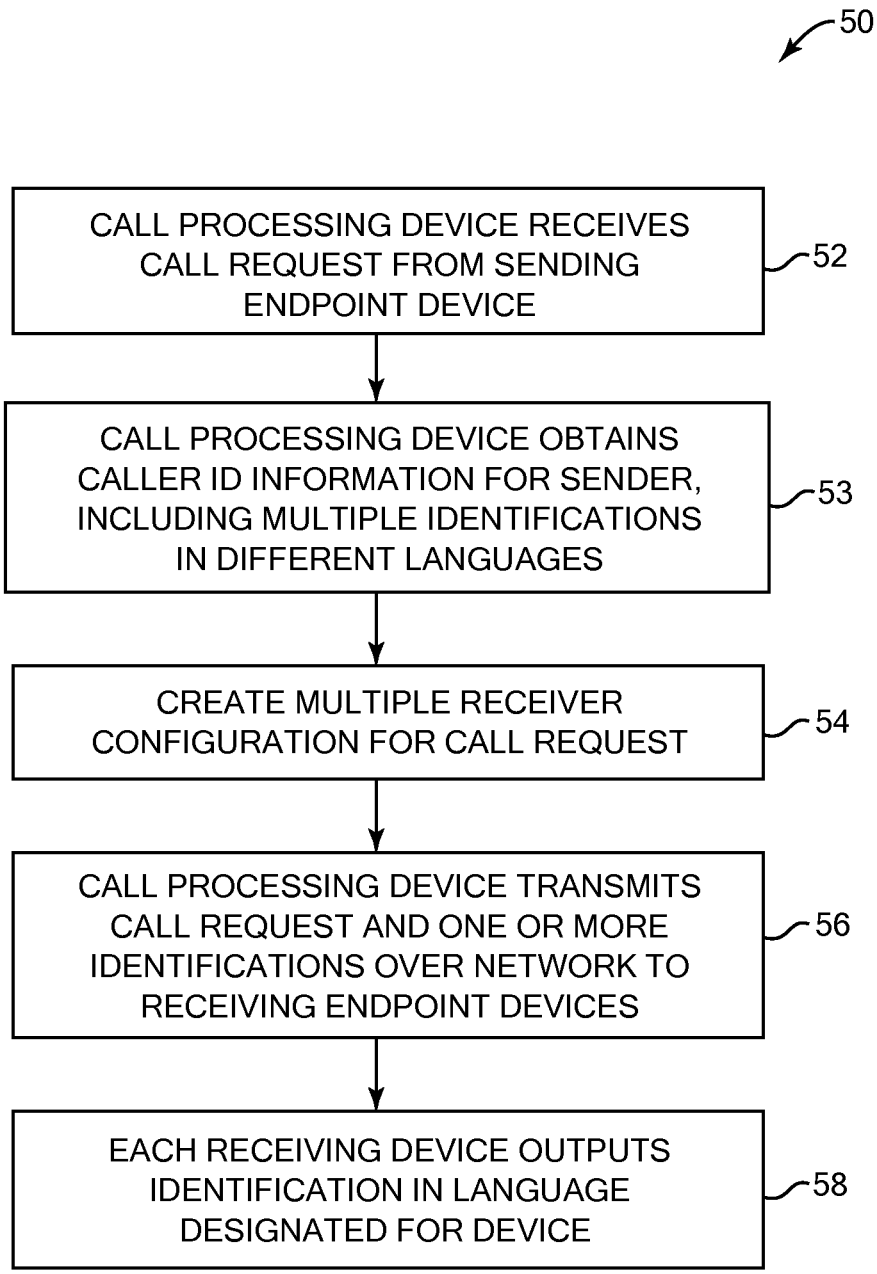
FIG. 2 is a flow diagram illustrating one method by which caller identification information is provided in multiple languages according to embodiments disclosed herein.

FIG. 2 is a flow diagram illustrating an example method 50 in which caller identification information is provided from a sending communication device to receiving communication devices in multiple languages. This method can be implemented using the system 10 of FIG. 1, as referred to in several examples below, or can be implemented in a different system having communication devices. Method 50 can be implemented for different implementations and/or scenarios. Some more specific implementations based on method 50 are described below with reference to FIGS. 3 and 4.

The method 50 begins at block 52, in which a call processing device receives a call request from a sending endpoint device. In one example, the call processing device can be the near end call processing device 20 and the sending endpoint device can be the near endpoint device 12 as shown in FIG. 1. In other embodiments, the call processing device of block 52 can be the far end call processing device 30 or other server.

The call request can indicate which receiving device(s) are intended to receive the call request. For example, a far endpoint device 32 can be designated as the recipient of the call request. Some embodiments allow the call request to specify multiple recipients, such as far endpoint devices 32 and 42. In one example, a "forked configuration" or a "forking environment" is used to allow a single call request to be received by to multiple endpoint devices. The single call request can ring multiple endpoints at about the same time. In the examples herein, a call request is sent "downstream" from a sending device to a receiving device. In some embodiments, the call request is an SIP call invitation. For example, the SIP call invitation can be provided by an SIP agent running on the sending endpoint device. The call processing device 20 and/or 30 receiving the call request can be running software used to forward, parse, and/or process such call requests, such as software including an SIP stack. In other embodiments, a call request for a different protocol can be used.

In block 53, the call processing device 20 and/or 30 obtains caller identification (ID) information for the sending device. In some embodiments, the caller ID information is specified in multiple languages. More specifically, the caller ID information can include multiple identifications associated with the sending endpoint device. Each identification provides the same identification content specified in a different language. In some embodiments, caller ID information is obtained which is designated for use by one or more receiving endpoint devices for the call request.

The identifications obtained in block 53 can identify one or more users, entities, devices, or other senders of the call request. The content in the identifications specifies these senders. For example, the identifications can identify a user or organization at the sending endpoint device, or can identify the sending endpoint device itself or an associated device or system. In some examples, the content of the identifications can be the name of a user who is sending the call request from the sending endpoint device, or can be a caller's designation, such as job title, department title in an organization, an organization or department name, etc., specified in each of the multiple languages. The identifications can also include the originating calling number or other identification information.

Furthermore, in some embodiments multiple types of identifications can be included in the caller ID information. Each type of identification can include a different type of message content. At least one type of identification in the caller ID information can be specified in each of the multiple languages being supported. For example, the caller ID information can include an identification having a "name" type that includes content specifying the caller's name. That caller ID information can also include another identification having a "department" type that includes content specifying the caller's department in a company. At least one of these identifications is specified in multiple languages. The different languages can also be specified within the caller ID information in any desired character set or alphabet that is able to be displayed by a recipient.

In some embodiments of block 53, the call processing device 20 and/or 30 obtains the caller ID information by receiving all or part of this caller ID information in the call request message from the sending endpoint device 12. For example, all or part of the ID information can be inserted in a call request by a sending endpoint device 12 that originates the call request. In some embodiments, a user can input manually some or all of the caller IDs at the sending endpoint device 12 in the languages used. Or, an administrator can input or set up caller ID information content in supported different languages at the sending endpoint device 12. Some embodiments can use language translation functionality, such as translation software, at the sending endpoint device 12 to translate a caller ID message into one or more other languages used by the system. Such functionality can also be used to fill in identifiers in supported languages not input by the user or administrator. For example, an endpoint device 12, 32, or 42 can receive a caller ID message in English from a user or administrator, and language translation software can translate the message into the other languages that have been designated at the endpoint device or by a call processing device 20 and/or 30 of the system.

In other embodiments of block 53, the call processing device 20 and/or 30 obtains all or part of the caller ID information separately from the call request. For example, the call processing device can receive the caller ID in one or more separate messages from the sending endpoint device 12. In some embodiments, all the needed caller ID information can be received from the sending endpoint device 12. This can be caller ID information in all languages supported by the system or in all languages needed by receiving endpoint devices 32 and 42.

In other embodiments of block 53, none or a part of the caller ID information is received by the call processing device 20 and/or 30 from the sending endpoint device 12. The call processing device otherwise obtains the needed caller ID information. For example, in one embodiment the sending endpoint device 12 sends caller ID information specified in one language or in a subset of the needed or available languages supported by the communication system 10. The receiving call processing device 20 and/or 30 then obtains other identifications in the other available languages. For example the other identifications can be obtained by translating, generating, reading, or otherwise obtaining the identifications. In some embodiments the call processing device 20 and/or 30 can look up a received identifier in table or list an accessible storage device and find stored corresponding identifiers in the other supported languages. Some embodiments including such features are described below with respect to FIGS. 3 and 4.

In some embodiments for block 53, each caller identification can be specified in its own header in a call request message. Some examples of such headers are described in greater detail below. The language identifications can be obtained by a call processing device in the various ways described herein using an SIP embodiment, ISDN embodiment, H.323 embodiments, or other embodiments using other protocols.

In block 54, a multiple-receiver configuration can be created to allow multiple receiving endpoint devices to receive the call request. The multiple-receiver configuration can include all receiving devices intended to receive the call request. In some embodiments, multiple connections can be created by a server, such as a call processing device 20 and/or 30, to send a single call request from a sending endpoint device 12 to multiple receiving endpoint devices 32, 42, etc. In some embodiments, this allows a single call to ring multiple receiving endpoint devices 32 and 42 at the same or about the same time. In this example, the call request provided by the sending endpoint device 12 is to be sent to multiple receiving endpoint devices 32 and 42. Other embodiments can provide one receiving endpoint device.

For example, in some embodiments, the multiple-receiver configuration is a forked configuration. In one example of a forked configuration for block 54, in one embodiment a near endpoint device 12 can provide a call request to a near end call processing device 20, which provides the call request to another call processing server (such as far end processing device 30), which can fork the call request to both the far endpoint device 32 and the far endpoint device 42. The forked configuration that is created is based on the received call request, e.g., based on one or more recipients listed in the call request and or other information therein. Thus multiple receiving endpoint devices in the forked configuration can be dynamically determined for a provided call request. The SIP protocol, for example, includes forking functionality.

In some embodiments, to create the forked configuration of block 54, a call processing device receiving the call request can determine the multiple receiving devices 32 and 42 for the call fork based additionally on information other than in the call request. For example, the receiving endpoint devices for the call fork can be determined from predetermined or previously-received information stored by the call processing device 20 and/or 30, e.g., information received from various receiving endpoint devices 32 and 42. For example, a single recipient address specified in the call request may map to multiple addresses and endpoint devices determined by a call processing device 20 and/or 30.

One example of such a mapping is an "alias" stored at a call processing device 20 and/or 30. The alias provides the addresses for multiple endpoint devices that are mapped to a single alias address. An alias for an SIP forking configuration can be specified by a system administrator or by an endpoint user, for example. The call processing device 20 and/or 30 can thus examine the address of a call request, determine that the address is or uses an alias, and look up the addresses for the multiple endpoint devices associated with that alias. These associated multiple endpoint devices become the multiple receiving endpoint devices 32 and 42 receiving the call request.

In some embodiments of block 54, to determine current receiving endpoint addresses (under an alias or not) for the forking configuration, the call processing device 20 and/or 30 can access a registrar or location database (e.g., SIP location service) that maintains current addresses for endpoint devices of the communication system. For example, endpoint devices can send current address information to a call processing device 20 and/or 30 to update the registrar. The registrar can be implemented on the call processing device 20 and/or 30 or some other connected device of the system. Some embodiments can also store other information for each endpoint device address in an alias, such as a language indicator indicating which language(s) are designated for use at that endpoint device. Such an embodiment is described below with respect to FIG. 4.

In other embodiments for block 54, the call request can itself specify particular multiple receiving endpoint devices 32 and 42 for the call request. Such specified addresses can be used solely to determine the endpoint devices for the forked connection, or they can be used in conjunction with other addresses for receiving endpoint devices determined based on other-obtained information such as one or more aliases or other stored server information.

In some embodiments, a receiving endpoint device 32 and/ or 42 can perform some or all of the configuring functions of block 54. For example, a receiving endpoint device 32 and/or 42 can include proxy server functionality and call forking functionality as described above. In other embodiments, the sending endpoint device 12 can specify one or more of the multiple receiving endpoint devices 32 and/or 42, e.g., in the call request.

A forked configuration can be created in block 54 under various different conditions. For example, in some cases, a forked connection is created for an existing call or conference between two endpoint devices in response to an additional endpoint device requiring a connection to the existing call. For example, a far end call processing device 30 can create a forked connection to a second far endpoint communication device 42 for an existing call between the near endpoint device 12 and the first far endpoint device 32. In another example, a server such as a call processing device 20 and/or 30 can bridge two endpoint devices into a single call by creating a forked connection between the two devices. In some cases, a call request can be forwarded to a different receiving device by forking a connection to the different device (and, in some cases, disconnecting the previously-connected device). In still other cases, a call request can be extended to one or more additional receiving devices 42, such as to a mobile phone or other electronic device, by forking a connection to the additional receiver device. In method 50, language support for any form of forking is provided by the system 10.

In other embodiments, block 54 can provide other types of configurations in the network that allow transmission of a call request and call information to multiple endpoint receiving devices. For example, in an ISDN or H.323 protocol embodiment, a call processing device (e.g., a private branch exchange, PBX) can receive a call request similarly as described for SIP embodiments and can determine multiple receiving endpoint devices based on information in the request. In some embodiments, the call processing device can send the call request to each determined receiving endpoint device based on a known mapping of endpoint addresses to one or more called parties specified in the request. The known mapping can be provided by an administrator of the system, for example. In some embodiments, this configuration can be implemented similarly to a conference call or to a bridge handled by the call processing device. For example, the PBX can establish a connection to each receiving endpoint device that answers the call request. Some of these embodiments can use a near end call processing device 20 and far end call processing device 30 as described with reference to FIG. 1. For example, a near end call processing device can forward a call request to a far end call processing device, that in turn can handle the sending of the call requests and connections to multiple far end receiving endpoint devices.

In block 56, the call processing device 20 and/or 30 transmits the call request and one or more of the identifications in different languages over the call network to the receiving endpoint devices 32 and 42. This block can be implemented in various ways for different embodiments. For example, in some embodiments, all of the identifications in all available languages are transmitted to a call processing device 20 and/ or 30 and/or to receiving endpoint devices 32 and 42. Such embodiments are described in greater detail below with respect to FIG. 3. Other embodiments can include selection (and/or obtaining) of a subset of supported language identifications to send to a call processing device 20 and/or 30 and/or to receiving endpoint devices 32 and 42. Such embodiments are described in greater detail below with respect to FIG. 4.

In block 58, each receiving endpoint device 32 and 42 in the forked configuration has received one or more language identifications and outputs at least one appropriate identification in a language designated for use by that device. For example, the language can be appropriate for the user of that device, who has selected that language in known preferences or other predetermined data, or the language can be appropriate for that endpoint device which may have technical limitations for different language support. In one example, a receiving endpoint device which has been designated to use the Spanish language (e.g., designated by the user of that device or by some other entity) will output the caller ID information in Spanish, while a different forked receiving endpoint device designated for Japanese characters and language will output the same caller ID information content in that language and character set. In an SIP embodiment, for example, a user agent running at each receiving endpoint device 32 and 42 can select and extract an appropriate caller ID in a designated language for the endpoint device (as well as perform standard other functions for the communication system, such as acknowledging the call request).

In some embodiments of block 58, one or more receiving endpoint devices receive more than one language identifier and can output the caller ID in multiple languages. For example, a user or particular endpoint device may have multiple designated languages for display.

In some embodiments of block 58, the receiving endpoint devices 32 and 42 can display the appropriate identification on a display screen visible to a user of the receiving endpoint device, and/or can output the identification to a user in other ways, e.g., using audio that speaks the word(s) of the caller ID. For example, voice synthesis software can be used at one or more receiving endpoint devices 32 and/or 42 to output such audio.

The caller ID language(s) that are output at a particular receiving endpoint device 32 or 42 in block 58 can be dynamically determined in some embodiments. For example, the caller ID languages can be determined based on the call request. In some examples, the output languages can be determined based on the caller ID information and/or other information associated with the caller or sender of the call request, associated with the sending endpoint device 12, and/or associated with the system 10. In one example, a receiving endpoint device 32 can receive multiple language identifiers and select one or more of these identifiers for output based on a name, telephone number, address, and/or other identifying information in the caller ID or call request. In some embodiments, the particular language that is output can be selected at least partially based on other characteristics of the caller or sending endpoint device, such as the caller's location, region, or company, the caller's time of sending the call request, or other information that can be relayed in the call request or caller ID information. In some embodiments, the receiving endpoint device can consult other available data to determine the characteristics, such as determining a name from a database based on a calling party's number, or determining a region from a database based on received coordinates or other information. In some embodiments, the user or administrator of a particular receiving endpoint device can provide preferences (e.g., settings or aliases) to specify this criteria that selects which language(s) are displayed at that endpoint device. For example, this criteria can be specified in a lookup table or equivalent data in which the receiving endpoint device software or controller compares criteria in the table with information received in the call request and/or caller ID information. In other embodiments, a call processing device 20 and/or 30 can perform the selection of languages based on these preferences as described above, where the preferences can be stored at a call processing device 20 and/or 30 or an endpoint device 12, 32, and/or 42.

It should be noted that the order of blocks shown in method 50 is not the only order in which these blocks can be performed, and the blocks can be performed in different orders and/or at least partially simultaneously where appropriate. For example, the forked configuration of block 54 can be created at different stages of the method in different embodiments, e.g., before or after other blocks of method 50 are performed, or simultaneously created with the implementation of one or more other blocks.

In some embodiments, caller ID information can also be sent in the reverse direction. For example, the information can be sent upstream from the receiving endpoint devices 32 and/or 42 to the sending endpoint device 12. In one example, caller ID information associated with each receiving endpoint device 32 or 42 can be sent back to the sending endpoint device in an acknowledgement, response, or other message from each receiving endpoint device or a subset of the receiving endpoint devices. The response message can include multiple identifications, each in a different language similarly as described above, or the multiple identifications can be provided in multiple response messages. In one example, a call processing device 20 and/or 30 can obtain identifiers in the other supported languages and insert them in one or more response messages similarly as for the call request as described above. The multiple identifiers can then be sent to the sending endpoint device 12. The sending endpoint device 12 can output to its user an identifier received in such a response. The identifier is specified in a language designated for that sending endpoint device 12. Such features can allow a user of the sending endpoint device 12 to view or receive identifying information associated with the receiving endpoint devices and/or users thereof.

Some embodiments can also send one or more additional information items along with the caller ID information to the receiving endpoint devices. For example, the content of an information item can specify a particular message from the caller to the receiving user (e.g., "meet me at noon today"), and/or status information relating to the user, relating to the sending endpoint device, relating to the system and/or network, etc., and/or other type of content. For a particular information item message, multiple information items can be obtained. Each of these information items specifies the same content in a different language than the other information items. For example, a call processing device can obtain the multiple information items from a sending endpoint device and/or after receiving a call request, similarly to obtaining multiple identifications using the various techniques described herein.

At least one of the information items is transmitted over the network to be received by the multiple receiving endpoint devices. Each receiving endpoint device outputs at least one of the information items specified in the language designated for use by that receiving endpoint device. For example, one or more receiving endpoint devices can output both a caller ID and one or more information items, in one or more languages designated for use by those receiving endpoint devices.

Language Identification and Information Item Examples

In some embodiments, each of the multi-language identifications used in the caller ID information can be specified in its own header in a call request message. Some examples of such headers are now described.

In some embodiments, each header specifies the caller identification in a different language. One example of such a header is set forth below in ABNF (Augmented Backus-Naur Form) notation for a SIP embodiment:

PAlternateID="P-Alternate-ID" HCOLON (name-addr/addr-spec) SEMI language-param language-param="language" EQUAL language-range In this example, the "PAlternateID" keyword indicates that this statement is specifying an identification message for caller ID. The "'P-Alternate-ID'" message is the text content that is provided as the identification, followed by the address information for a receiving device. The "language-param" keyword defines a "language" parameter or tag that is set equal to a specified language ("language-range" in this example) which indicates the language of the identification. For example, four headers using this notation are set forth below:

P-Alternate-ID: "Accounts Department"<3001@example.com>;language=en

P-Alternate-ID: "Departamento de Cuentas"<3001@example.com>;language=es

P-Alternate-ID: "Comptabilité"<3001@example.com>; language=fr

P-Alternate-ID: "БУХГАЛТЕРИЯ"<3001@example.com>;language=ru

In this example, these headers provide an identification for a call being sent from a sending endpoint device in an "Accounts Department" of a company to other endpoint devices. The first header is an identification in English relaying the identification content "Accounts Department" and its language parameter "en" indicating the language is English. The second, third and fourth headers include the same content specified in the different languages indicated by the "es" (Spanish), "fr" (French), and "ru" (Russian) language parameters.

An example of a call request message is set forth below for the SIP protocol that includes caller ID information providing multiple identifications in different languages, where the identifications are provided as headers in the same format as above:

INVITE sip:3000@example.com SIP/2.0

From: "Accounts Department"<sip:3001@example.com>;tag=tag1a

To: "John doe"<sip:3000@example.com>

Contact: "Accounts Department"<sip:3001 @ 10.0.0.200; transport=tls>

P-Alternate-ID: "Accounts Department"<3001@example.com>;language=en

P-Alternate-ID: "Departamento de Cuentas"<3001@example.com>;language=es

P-Alternate-ID: "Comptabilité"<3001@example.com>; language=fr

P-Alternate-ID: "Счста команды"<3001@example.com>;language=ru

Alert-Info: <cid:internal@example.com>;alt=internal

Accept-Contact: *;+line=1

In this example SIP message, the INVITE statement identifies the message as a call request and identifies the SIP protocol and receiving address, then specifies the sending ("from") address of the caller, the receiving ("to") address that the call is being addressed to (which can be a more specific address), and a "contact" address at which to call back. The caller ID is specified in the four "P-Alternate-ID" headers, each for a different language. The "alert info" specifies parameters as to how the receiving phone will ring, and the "accept contact" line specifies which phone lines to use. Other or additional communication parameters and functions can be specified in other call request implementations. In this example, all the identifications in the multiple languages are included in a single message that also includes the call request. Other embodiments can provide one or more language identifications in one or more separate messages. Some embodiments can provide all or some of the identifications separately from the call request.

One or more endpoint devices can be provided with software and/or hardware that implements and recognizes the additional language headers. For example, an SIP endpoint device can be running an SIP user agent that inserts the headers into outgoing call requests and/or processes received multiple language identifiers for output to a user. Call processing devices 20 and/or 30 used in the system can similarly be provided with server software functions that can insert, parse, and process the additional headers, e.g., added to the server software of call processing devices. For example, the call processing device software can be enabled to recognize the caller ID header keywords described above and process the headers accordingly.

Other communication standards or protocols can be used to provide multiple language headers or identifications in other embodiments. For example, in an embodiment using the ISDN communication standard, information elements are provided in a protocol message such that each information element specifies call information such as the calling party number, calling party name, call forwarding information, etc. Multiple language identifications as described herein can be added to one or more information elements in an ISDN message. Each identification can, for example, specify particular identification content in a particular language, and specify a language tag identifying the language. One or more identifications can be included in an information element, and one or more of these caller ID information elements can be packaged within a ISDN (e.g., Q.931) protocol message. For example, the ISDN message can be a call request or setup message. In some embodiments, for example, a manufacturer specific information (MSI) element can be provided in a proprietary section of the ISDN message with these language identifications. A similar information element can be used in other protocols, such as the H.323 protocol, which uses the information elements provided for Q.931 and ISDN.

Some embodiments can include information items other than identifications in multiple languages, such as caller messages, status information, etc. as described above. In some embodiments, the information items can be provided as one or more separate headers, each information item in a different language. The information items can be provided with caller ID information in some embodiments, or separately from the caller ID information. In one example, one or more of the information items can be included in a call request. A call processing device 20 and/or 30 that receives one or more information items can obtain multiple language information items similarly as described above for caller ID information. For example, a specific keyword can be used to define such information items in headers of a call request. Using such headers, multiple messages can be transported from a source to a destination extension.

In one example, an information item can be specified in a statement or header that provides the message content of the information item itself and the language of the item, similarly to the headers described above for caller ID information. One example of such a header is set forth below in ABNF notation for a SIP embodiment. Other protocols can provide information elements or other items providing similar information.

Pmessage="P-Message" HCOLON quoted-string SEMI Language-param

Where "Pmessage" is the keyword, "P-Message" is the message content of the information item and the "Language-param" is a tag specifying the language of the message content. One example is shown below for English and Spanish language versions of particular text message content included as information items.

Pmessage: "Meet me at noon today"; language=en

Pmessage: "Encuéntreme al mediodía hoy"; language=es

Such information items can also be used in embodiments using features similar to "leave word calling" (LWC) in which a caller leaves a message and/or identification information at a receiving endpoint device. For example, in some systems, a sending endpoint device sends out a LWC message indicating that LWC is active for that message and including caller ID information. A receiving endpoint device receives the LWC message and a light or other indicator is lit on the receiving endpoint device. The lit indicator acts as a message that a caller has made a call to that endpoint device. The caller ID information is also output at the receiving endpoint device to indicate which number or caller to call back. In such systems, the information items described above can be sent by a sending endpoint device (or call processing device) along with or in addition to the LWC message or similar type of message.

Other Embodiments

Figure 3:
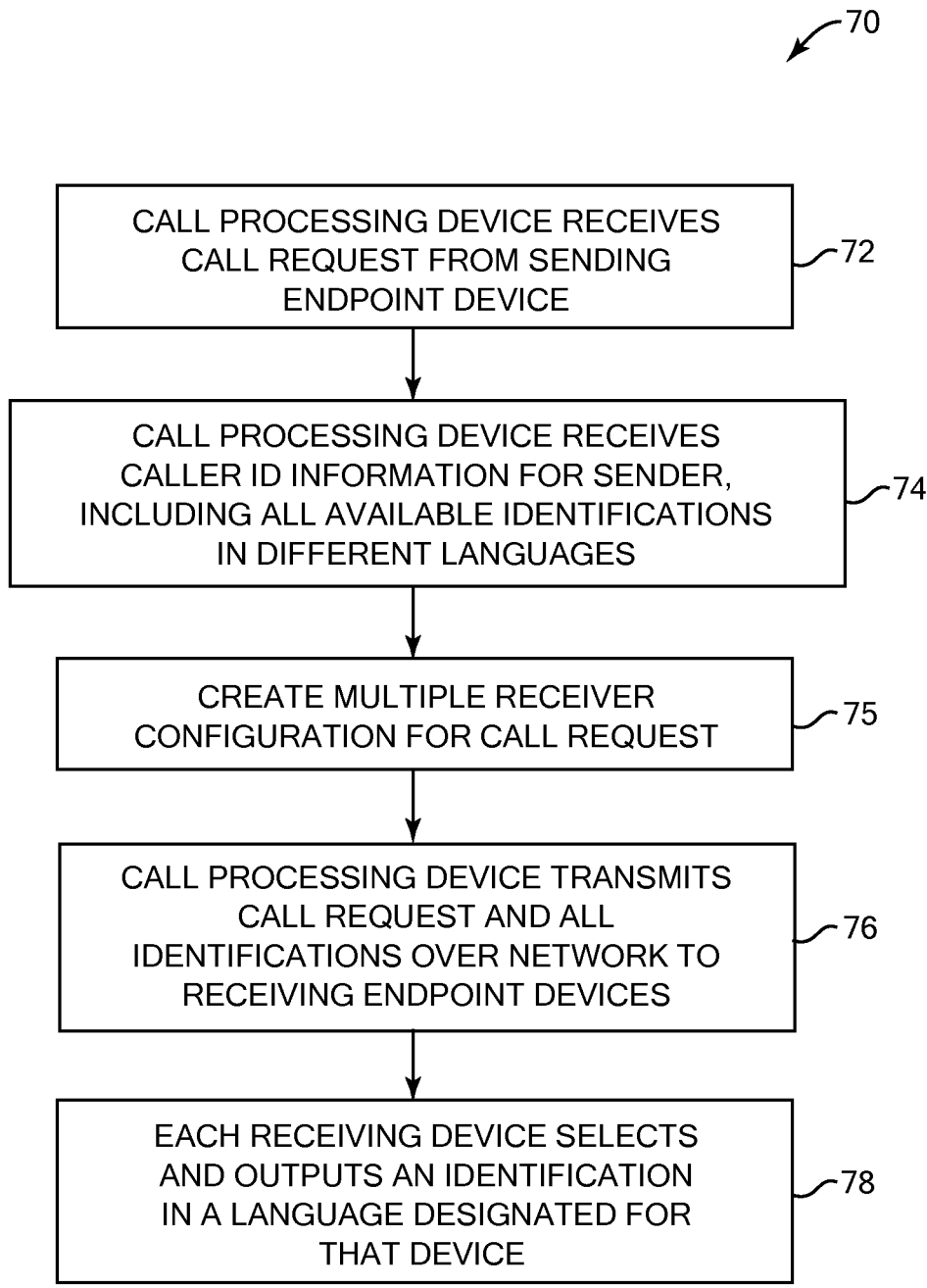
FIG. 3 is a flow diagram of an example method illustrating one or more embodiments for the method of FIG. 2.

FIG. 3 is a flow diagram of an example method 70 illustrating some additional embodiments for the method 50 of FIG. 2. Generally in method 70, identifiers specified in all supported languages are sent to each of the receiving endpoint devices.

In block 72, a call processing device receives a call request from a sending endpoint device, similarly as explained above for block 52 of FIG. 2. In block 74, the call processing device receives caller identification information associated with the sending device 12. In some embodiments, this caller ID information is included in the call request message. In other embodiments the caller ID information can be provided separately from the call request. The caller ID information can include multiple identifications, where each identification provides the same identification content specified in a different language. For example, the caller ID information can include identifiers specified in all languages that are available or supported for the communication system 10, network, and/or communication devices. In some embodiments, these identifiers can be provided in one or more headers of a call request message as explained above for FIG. 2, or can be provided in another form.

In other embodiments of block 74, the call processing device 20 and/or 30 receives one or more identifications from the sending endpoint device. These identifications can provide a subset of the available or supported languages. For example, there might be one language identifier received specifying the caller ID in one language. In such embodiments, the call processing device 20 and/or 30 can create or otherwise obtain identifiers in the other available languages (if needed). For example, in one embodiment the call processing device 20 and/or 30 can look up a received identifier in table or list an accessible storage device and find stored corresponding identifiers in the other available languages. In another embodiment, the call processing device 20 and/or 30 can translate a received identifier into other languages using translation software and/or an accessible database.

In block 75, a multiple receiver configuration can be created for the call request in some embodiments. For example, one or more forked connections can be created based on information or preferences stored at a call processing device 20 and/or 30 or based on multiple recipients specified in the call request, as described above. In some example embodiments a call processing device 20 and/or 30 accesses an alias for an recipient address provided in the call request and determines multiple receiving endpoint addresses included in that alias for receiving the call request. The endpoint devices referenced by an alias can be specified by input from one or more users or administrators, or by system settings. In some embodiments, the near end call processing device 20 creates the forked connection(s). In other embodiments, the far end call processing device 30 creates the forked connection(s). For example after receiving the call request and caller ID information from the near end call processing device 20.

In block 76, a call processing device 20 and/or 30 transmits the call request and all language identifications over the network to the receiving endpoint devices 32 and 42. In some embodiments, the near end call processing device 20 transmits this request and call ID information to a far end call processing device 30. The far end call processing device 30 then proxies the request and all the identifications to each forked receiver endpoint device. In another embodiment, the near end call processing device 20 sends the call request and all of the identifications directly to each receiving endpoint device 32 and 42 without use of a far end call processing device 30. For example, each receiving endpoint device 32 and 42 can include functionality to provide any required processing and/or administration otherwise provided by a far end processing device 30.

In block 78, each receiving endpoint device 32 and 42 has received the call request and all the language identifiers in the caller ID information. Each receiving device selects an identifier specified in a language designated for use by that receiving device. The receiving device then outputs the selected identifier to a user of the receiving device. For example, in one SIP embodiment the receiving endpoint device 32 and 42 can look at a language parameter of each language header in the call request message to find a match to the designated language for that receiver. Some types of endpoint devices may support one of the languages due to technical limitations, in which case a single default language can be the designated language for that endpoint device.

In some embodiments of block 78, there can be multiple designated languages for a receiving endpoint device 32 and 42, in which case all designated language identifications can be output. Alternatively, each receiving device can output all the received identifiers to the user. The user is then allowed to select one of the presented identifiers that is specified in a desired language by providing user input with an input device (touchscreen, button, pointing device, voice command, etc.). In this way, the user indicates the preferred language for that user and designated language for that endpoint device.

In other embodiments of block 78, the selection of which particular language(s) to display at a receiving endpoint device is based on other criteria, such as stored preferences. Such preferences can, in some embodiments, be stored in a storage device at each receiving endpoint device 32 and 42. In one example, the criteria can include dynamic characteristics such as the caller ID information received in the call request, and/or other characteristics associated with the caller or sending endpoint device (identity of the caller, location, status, time of call, etc.), as described above. The receiving endpoint device can examine the criteria and the characteristics of a call request to determine which language(s) are to be displayed at that receiving endpoint device.

In an alternate embodiment, a far end processing device 30 can receive the call request and all the language identifiers transmitted in block 76. The far end processing device 30 selects identifier(s) in the designated language(s) for each of the receiving devices and then sends the appropriate identifier(s) to each receiving endpoint device 32 and 42 for output to a user. For example, the far end processing device 30 can have access to language indicators indicating the language(s) designated for use by each of the receiving devices, to select the matching identifier appropriately. In some embodiments, this language information can be sent to the far end call processing device 30 from each receiving endpoint device 32 and 42 previous to the call being initiated by the call request. For example, the language information can be provided during administration communications of the system. Such an embodiment can be similar to the identifier selection described below with respect to FIG. 4, for example. In some embodiments, the call processing device can access a table, registrar, or other stored information including language indicators indicating a preferred or designated language for each endpoint device of the communication system.

Figure 4:
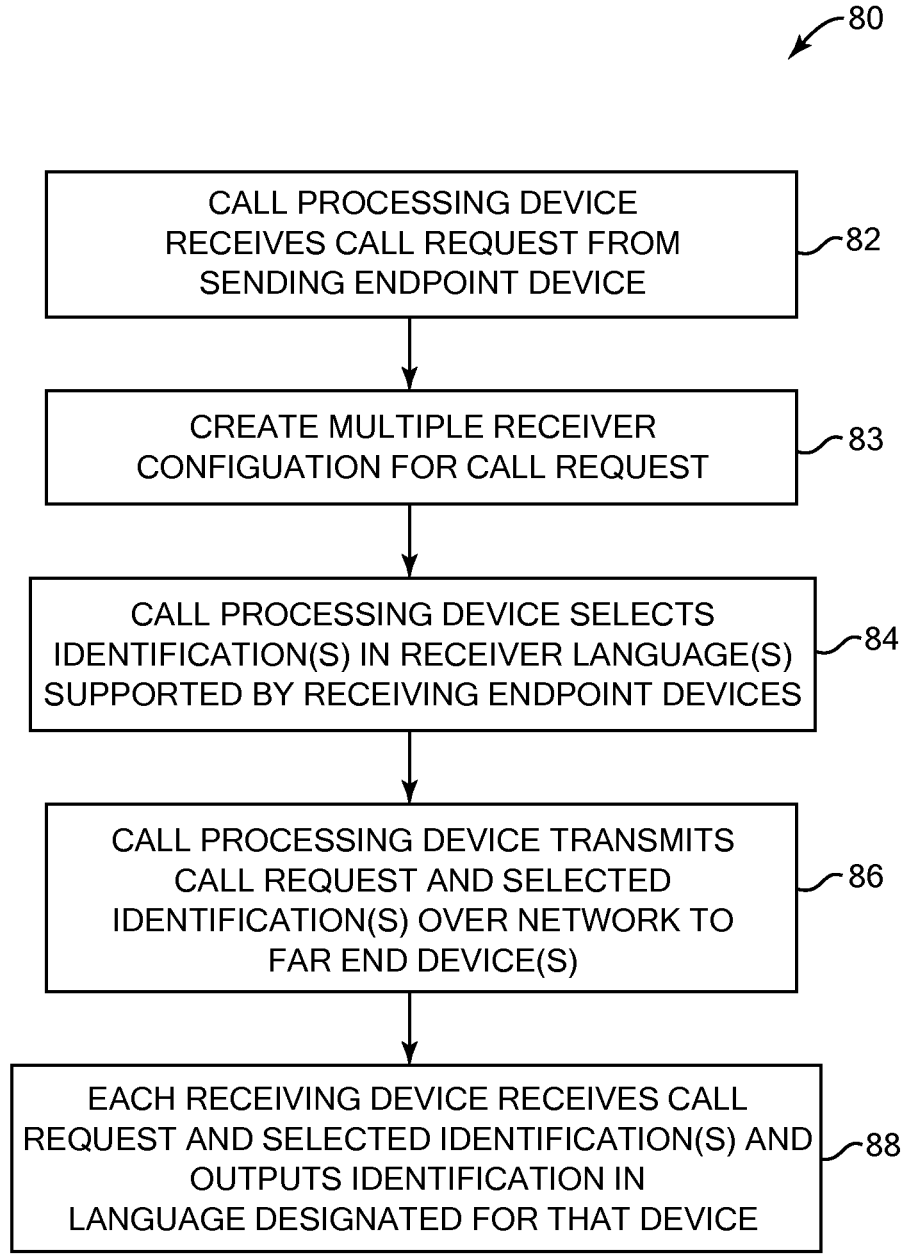
FIG. 4 is a flow diagram of an example method illustrating one or more additional embodiments for the method of FIG. 2.

FIG. 4 is a flow diagram of an example method 80 illustrating other embodiments for the method 50 of FIG. 2. Generally in method 80, appropriate or designated language identifiers for one or more receiving endpoint devices are selected and sent to those receiving devices.

In block 82, a call processing device receives a call request from a sending endpoint device, similarly as explained above for block 52 of FIG. 2. The call processing device can be the near end call processing device 20, or in other embodiments can be the far end call processing device 30. In some embodiments, all identifiers in all the supported languages are received by the call processing device 20 and/or 30, while in other embodiments one or a subset of supported languages are received. In block 83, a multiple receiver configuration can be created for the call request in some embodiments, such that multiple receiving endpoint devices 32 and 42 can receive the call request, similarly as described above for FIGS. 2 and 3.

In block 84, the call processing device 20 and/or 30 selects the identification(s) that are specified in languages designated for use by (e.g., determined for use by) the receiving endpoint devices. To perform this selection, the call processing device determines the language(s) needed for each receiving endpoint device. In some embodiments, the receiver languages are determined based on one or more receiver language indicators associated with each of the receiving endpoint devices. The language indicators are accessible by the call processing device 20 and/or 30 making the determination. Each receiver language indicates the one or more languages designated for an associated receiving endpoint device. In some embodiments, these indicators can be in a similar format to the headers described above for the caller ID information, although they need not include caller identification content. The language indicators can be sent to call processing device(s) 20 and/or 30 by their associated endpoint devices (e.g., based on user preference input at each endpoint device). Or, the language indicators can be determined by or assigned by a call processing device (e.g., by an administrator).

In one example implementation for block 84, each receiving endpoint device (e.g., far endpoint devices 32 and 42) can send a receiver language indicator to the call processing device to allow language determination for each receiving endpoint device. In some embodiments, these receiver language indicators are sent directly from the receiver endpoint devices to the near end call processing device 20 (or through a transparent far end call processing device), and the near end call processing device determines language identifier selection. In other embodiments, the receiver language indicators are sent first to the far end call processing device 30, which can send the indicators to the near end call processing device, which then performs the selection. For example, a call processing device 20 and/or 30 can receive the language indicators as data received previously from the endpoint devices, e.g., as periodic updates or via polling the endpoint devices. In some embodiments, the far end call processing device 30 can aggregate the receiver language indicators from each receiving endpoint device 32 and 34 into an aggregated language indicator that is sent to the near end call processing device 20. In some embodiments, the far end call processing device 30 can provide the receiver language indicators based on its predetermined knowledge of the receiver endpoint devices and the languages used, and send those indicators to the near end call processing device 20 which performs the selection.

In some embodiments, the receiver language indicators can be sent from the receiving endpoint devices 32 and 42 (or from the far end call processing device 30) in response to a query first sent by the near endpoint device 12 or by the near end call processing device 20 to the receiving endpoint devices (or far end call processing device). For example, before sending the call request and the caller ID information to the receiving endpoint devices, a SIP Options query can be sent by the near end call processing device 20 to the far end call processing device 30. Receiving the query causes the far end call processing device 30 to send the receiver language indicators to the near end device. Alternatively, the receiving endpoint devices 32 and 42 can receive the query and respond by sending back the language indicators. In other embodiments, the call request (without the caller ID information) can be sent to the receiver endpoint devices 32 and 42 which causes the response of receiver language indicators back to the sending call processing device 20 and/or 30 or sending endpoint device 12.

Some embodiments of block 84 can use receiver language indicators that are separate or individual messages sent for the purpose of specifying the receiver languages. In other embodiments, the receiver language indicators can be included in a message having other information, such as caller ID information, e.g., sent by the receiver endpoint devices to the near endpoint device. In some of these embodiments the receiver language indicators can be specified in headers similar to those described for FIG. 2.

In some alternate embodiments, the near endpoint device 12 can receive the receiver language indicators and select the appropriate subset of language identifications for the caller ID information, sending the appropriate identifications to a call processing device such as the near end call processing device 20.

In some embodiments for block 84, the language indicators can be stored in a database or other storage accessible to one or more of the call processing devices 20 and/or 30. For example, the indicators can be stored in a database, registrar or table (e.g., in a lookup table). In one example embodiment, a call processing device determines the forked receiving endpoint devices by consulting an alias that was designated or pointed to by the call request. In such an embodiment, an associated language indicator can be stored in the alias for each endpoint device address in the alias. This language indicator indicates which language(s) are designated for use at the associated endpoint device. For example, the designated language can be specified by a user of the associated endpoint device, or by administrator or default system setting. In another example, some ISDN, H.323, and other protocol embodiments can include a table provided on a call processing device or endpoint device. The table can associate language tags or other types of language indicators to specific endpoint devices (e.g., addresses for the endpoint devices). This allows designated languages for particular endpoint devices to be found by the call processing device. This table can be used to route particular language identifications to corresponding endpoint numbers.

In some embodiments, the language identification(s) designated for use by a receiving endpoint device and selected by the call processing device in block 84 can be dynamically determined by the call processing device based on other or additional criteria accessible to the call processing device. For example, the language identifications selected for each particular receiving endpoint device can based on stored preferences. These preferences can indicate the designated language(s) for each receiving endpoint device based on specified criteria in the preferences. For example, the preferences can be previously sent to the call processing device from each endpoint device. The user of an endpoint device may provide the preferences for that endpoint device in some embodiments, and/or an administrator can provide the preferences. In one example, the preferences are examined by the call processing device to select one or more designated languages based on information provided in a call request. This information can include characteristics of a caller or sending point device, such as indicated by caller identification information (e.g., specified caller or sending endpoint device identities such as name, address, etc.), and/or other information such as current location of a caller or sending endpoint device, time of call, statuses of caller or sending endpoint device, etc. Alternatively, after receiving a call request, the call processing device can request such preferences for language selection from the receiving endpoint devices. Thus, the preferences can determine language(s) of the identifications to be sent to a receiving endpoint device based on these characteristics.

After examining such preferences and determining which language(s) are currently designated for a particular receiving endpoint device based on the preferences as described above, the call processing device can then select the corresponding designated language identifications. In some embodiments this selection can include selecting one or more identifications received by the call processing device, e.g., in a call request. The selection can also or alternatively include obtaining one or more of the selected language identifications that were not received by the call processing device. For example, the obtaining can include retrieving additional language identifications from storage, translating a identification into one or more other languages, or otherwise generating the identifications to be selected similarly as described in other embodiments herein.

In block 86, the call processing device 20 and/or 30 transmits the call request and the identifications in the selected languages over the network to the receiving endpoint device(s). In some example embodiments, the call request and identifications are sent to the far end call processing device 30 from the near end call processing device 20. The far end call processing device 30 can then determine which languages are designated for each of the receiving endpoint devices 32 and 42. The far end call processing device 30 can route the appropriate individual identifications to each receiving endpoint device in the forked configuration based on the known information describing the designated language(s) for each endpoint device. In other embodiments, the near end call processing device 20 can send the call request and all the selected subset of identifications directly to each of the forked receiving endpoint devices.

In block 88, each receiving endpoint device 32 and 42 receives the call request (if not previously received) and selected identifications. In some embodiments, each receiving endpoint device receives identifications in languages designated for use by that device, and the device can output the received identifications. In other embodiments, a receiving device 20 and/or 30 might receive all the selected subset of identifications which can include some languages not designated for use by a device (e.g., used by one or more of the other receiving endpoint devices). If so, the receiving endpoint device can (in some embodiments) select and output only the identifications provided in designated languages, or allow a user to select a desired language from an output of multiple languages.

Thus, a call processing device can determine which languages are used by the collective set of receiving endpoint devices and send the corresponding set of used-language identifications such that each receiving endpoint device receives and outputs caller identification information in a language designated for use at that endpoint device.

There may be an undesirable delay in starting a call for some of the embodiments of the method of FIG. 4. The delay can be caused by the need to receive language indicators from receiving endpoint devices before the appropriate-language caller ID information can be output by the receiving endpoint devices 32 and/or 42. In some embodiments, to reduce the delay, a call request can be sent to and initiated at the receiving endpoint devices while the appropriate language identifications are being determined. Any of several embodiments can be used. In one embodiment, a query and/or initial call request is provided to the receiving endpoint devices. This query causes the receiving endpoint devices to ring to indicate the incoming call without the output of any caller ID information. The receiving endpoint devices 32 and/or 42 respond to provide the language indicators to the call processing device 20 and/or 30. The call processing device selects the appropriate language caller identifications and sends them to the receiving endpoint devices for output. The caller ID information can therefore be displayed at the receiving devices 32 and 42 after the call starts ringing, but quickly enough to give the receiving user the caller ID information before the call needs to be answered. In another embodiment, caller ID information can be initially provided and output in a single default language (e.g., a default of the receiving endpoint device or a default of the telephone system), until the appropriate language identification is determined and the output changes to the appropriate language similar to the previous example. In another embodiment, the first call request message can be provided with all the supported language indicators of the system 10 (similar to the embodiments of FIG. 3) to let the receiving devices select and output a desired language, and the receiving devices respond with language indicators. These embodiments can also allow subsequent messages or requests to the receiving endpoint devices 23 and 42 (such as UPDATE, INVITE, or INFO messages in SIP) to include caller ID information in the subset of languages used by the receiving devices as in the method 80.

Device Implementation Examples

Figure 5:
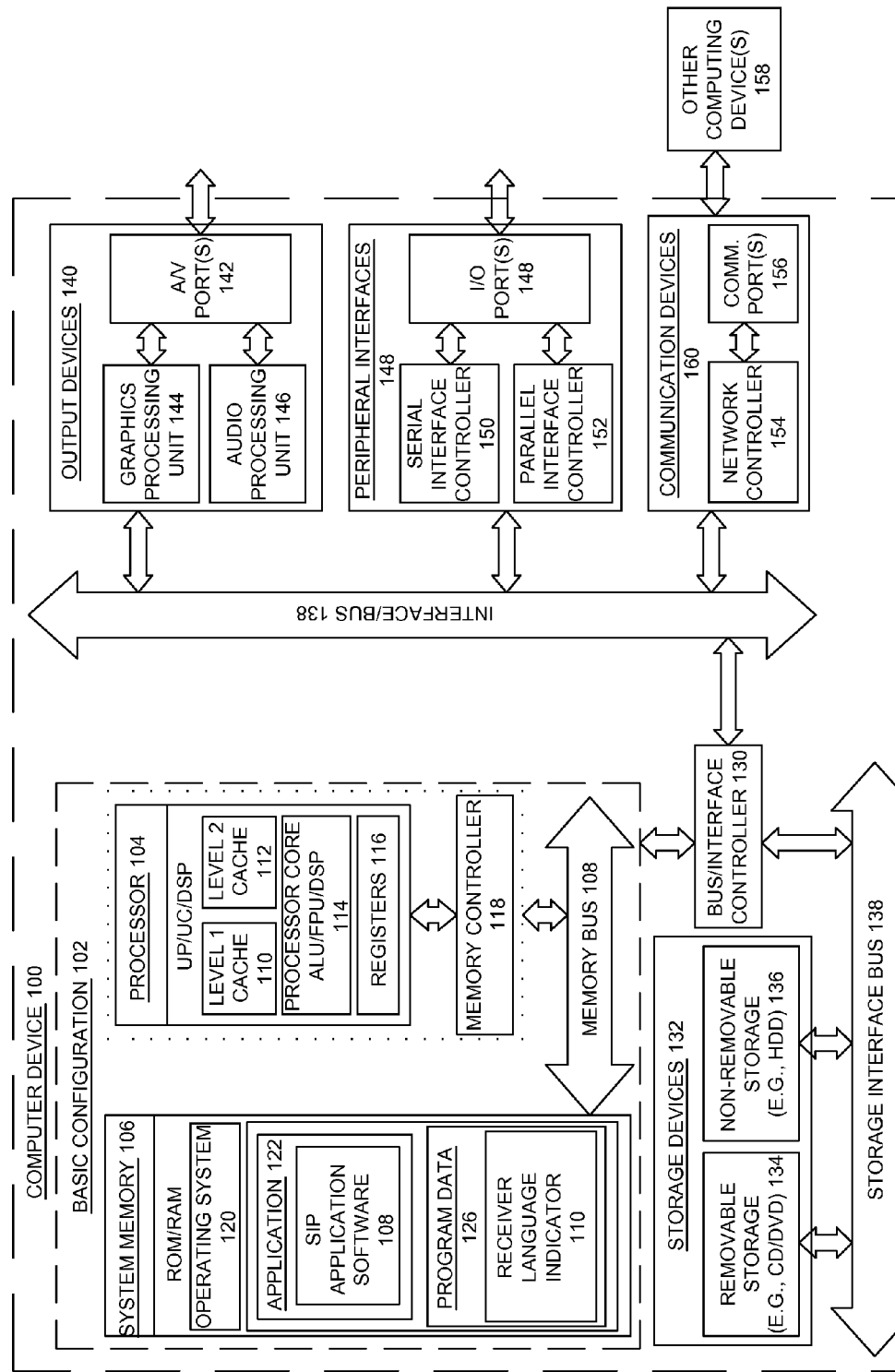
FIG. 5 is a block diagram of an embodiment of a call processing device which can be used to implement the embodiments described herein.

FIG. 5 is a block diagram illustrating one example call processing device 100 that can be used to set up a call environment in accordance with the embodiments described herein. For example, the call processing device 100 can be used in call processing device 20 and/or 30 as shown in FIG. 1. In a basic configuration 102, call processing device 100 typically includes one or more processors 104 and a system memory 106. A memory bus 108 can be used for communicating between processor 104 and system memory 106.

Depending on the desired configuration, processor 104 can be of any type including but not limited to a microprocessor, a microcontroller, a digital signal processor (DSP), or any combination thereof. Processor 104 can include one more levels of caching, such as a level one cache 110 and a level two cache 112, a processor core 114, and registers 116. An example processor core 114 can include an arithmetic logic unit (ALU), a floating point unit (FPU), a digital signal processing core (DSP), or any combination thereof. A memory controller 118 can also be used with processor 104, or in some implementations memory controller 118 can be an internal part of processor 104.

Call processing device 100 can include additional features or functionality, and additional interfaces to facilitate communications between basic configuration 102 and any required devices and interfaces. For example, a bus/interface controller 130 can be used to facilitate communications between basic configuration 102 and one or more data storage devices 132 via a storage interface bus 138. Data storage devices 132 can be removable storage devices 134, non-removable storage devices 138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media can include volatile and nonvolatile, removable and non-removable media implemented in any method or technology for storage of information, such as computer readable instructions, data structures, program modules, or other data.

System memory 106, removable storage devices 134 and non-removable storage devices 136 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by call processing device 100. Any such computer storage media can be part of or accessible by call processing device 100.

Call processing device 100 can also include an interface bus 138 for facilitating communication from various interface devices (e.g., output devices 140, peripheral interfaces 148, and communication devices 160) to basic configuration 102 via bus/interface controller 130. Example output devices 140 include a graphics processing unit 144 and an audio processing unit 146, which can be configured to communicate to various external devices such as a display device or speakers via one or more A/V ports 142. Example peripheral interfaces include a serial interface controller 150 or a parallel interface controller 152, which can be configured to communicate with external devices such as input devices (e.g., keyboard, mouse, pen, voice input device, touch input device, etc.) or other peripheral devices (e.g., printer, scanner, etc.) via one or more I/O ports 148. An example communication device 160 includes a network controller 154, which can be used to facilitate communications with one or more other computing devices 158 over a network communication link via one or more communication ports 156.

The network communication link can be one example of a communication media. Communication media can be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

In some embodiments, call processing device 100 can be implemented as a personal computer including both laptop computer and non-laptop computer configurations, or other electronic device. Other types of devices can be used for the device 100 in other embodiments, such as a server, mainframe, portable device, or other electronic device. Depending on the desired configuration, system memory 56 can be of any type including but not limited to volatile memory (such as RAM), non-volatile memory (such as ROM, flash memory, etc.) or any combination thereof.

System memory 106 can include an operating system 120, one or more applications 122, and program data 126. In some embodiments, application 122 includes SIP application software 108 executed by processor 104, which can implement SIP server functionality including an SIP stack, proxy server, and/or other SIP functions. The SIP application software 108 is configured to receive an initial input from the one or more communication interfaces and processes the initial input using one or more processors. For example, the software 108 can forward or otherwise transmit call requests and caller ID information, including parsing and processing the multiple different-language identifiers (such as headers) described herein. In appropriate embodiments, the SIP application software 108 is further configured to determine one or more receiver languages from one or more receiver language indicators embedded in one or more SIP messages, and/or otherwise determine languages designated for use for receiving endpoint devices based on accessible information. Alternatively, the software can be implemented as hardware or a combination of hardware and software. Other embodiments can similarly provide software and/or hardware appropriate for the use of other protocols, such as ISDN and H.323.

The near end and far end communication endpoint devices 12, 32, and 42 can similarly include one or more processors, memory, software, and other components. For example, microphone and speaker can be used to communicate audio signals to and from a user of the endpoint device, and a display device can display images and/or video of other users connected to a call, as well as caller ID information. In some embodiments, each device can include components similar to the configuration shown in FIG. 4 for the call processing devices 20 and/or 30. For example, in an SIP embodiment, the endpoint devices can include user agent software for handling calls in the SIP environment.

In the embodiments described above, the number of languages and the particular languages used and supported by the system can be implemented in different ways. For example, a central server can designate which languages are supported by the system. In one example, the supported languages can be based on language indicators sent in or polled from each endpoint device 12, 32, and 42 of the system 10. These indicators indicate the desired or designated language by one or more endpoint devices, similarly to the language indicators described for embodiments of FIG. 4. In some embodiments, a designated set of supported languages is determined by an administrator and is indicated to one or more call processing devices of the system 10. The supported languages can also be dynamic, such that new languages are added to and supported by the system as additional users use the system and desire to receive caller IDs in languages not previously supported. Further, some embodiments can designate different supported sets of languages for different endpoint and/or call processing devices, or for different groups of these devices. For example, a group of endpoint devices and call processing devices located in a company department in one country can use a first set of supported languages, and a different group of devices in another country can use a second, different set of supported languages having a least one language different than the first set.

Example Scenarios

Embodiments described herein can be used for a variety of different scenarios and configurations in which a caller ID for a requesting endpoint device 12 is output in different languages at one or more different receiving devices 32, 42, etc. For example, in one scenario, a calling user sends out a call request intended for a particular manager. The manager has a setup such that his phone as well as the phone of an administrative assistant will both ring at the same time upon the manager's phone receiving a call request. The manager speaks one language, such as Japanese, and wants a caller ID for the incoming call request to be displayed in Japanese with Japanese characters on his phone. However, the administrative assistant speaks a different language, such as English, and wants the same caller ID to be displayed in English on the assistant's phone. Embodiments herein allow caller IDs in these different languages to be displayed automatically at the receiving phones.

In an example implementation for such a scenario, a caller employee uses a first telephone as a near endpoint device 12 to make a call to a manager who speaks a different language and uses a second (receiving) phone as a receiving endpoint device 32. The first telephone provides a call request message over a network to an intermediary, near end call processing device 20, such as a server. The message includes a single caller ID, such as the calling user's name, title, and/or other identification. The near end call processing device 20 determines additional caller IDs that specify the same ID in other languages supported by the telephone system 10. All these additional caller IDs are inserted as headers in the call request message. The call processing device 20 sends the call request message to a far end call processing device 30, which determines that the receiving manager has a profile or alias that lists multiple endpoint devices to receive all incoming calls. In this example, the profile lists the manager's telephone 32 as well as another telephone 42 which his administrative assistant uses to also receive all calls made to the manager.

The far end call processing device 30 creates a forked configuration having the manager's and assistant's telephones 32 and 42 as far endpoint devices, and sends the call request message to both the manager's telephone 32 and the assistant's telephone 42. Each of these telephones receives the caller IDs in all the supported languages, and each telephone 32 and 42 displays to its user a single caller ID in the language that has been designated for use by the user at that telephone. Thus each call-receiving user in a forked configuration receives a caller ID in a desired language based on a single call request. Other embodiments of this scenario can use a variety of different implementations as discussed herein.

In another example scenario, an employee of an international company is located in a first country. The employee wants to call several other employees of the company for a conference call. The other employees are located in other countries and are using the same telephone system 10. The other employees each want a caller ID to be displayed at their phones 32 and 42 in their respective languages for the received call. In still another scenario, a person outside the company uses a telephone 12 that is not part of the company's system nor supports multiple languages. This person can call two company persons located in other countries who want the feature of caller IDs displayed in their appropriate languages. Such scenarios can be implemented as described above.

The call forking and alias example implementations (or the equivalent using other protocols) allow a user to customize languages for the user's different devices. In another example scenario, a user has set up multiple communication devices with a communication system so that all the user's devices 32 and 42 will ring when a call is made to that user. In some embodiments, this setup can be implemented using an alias as described above. The user would like each device to display a caller ID in a different language. The user sets up a first, preferred caller ID language (e.g., Spanish) on a first device of the alias, such as the user's land-line telephone. The user also sets up a second, different language (e.g., English) on a second device of the alias, such as the user's cell phone.

This feature has various uses. For example, a user can useful where a particular device may not be compatible with multiple language support. An endpoint device may have language restrictions and/or not be able to display a preferred language. Such non-compatible devices may include older devices, some devices using older or networks, and/or some cell phone networks having reduced language display or processing abilities as compared to newer or Voice over Internet Protocol (VOIP) devices. These non-compatible devices may require a single standard or particular language to be used. In one example, a cell phone or its service/network may support display of English caller ID while a computer phone may support display of a caller ID in a different and more familiar language known to the user. The multiple-language features described herein allow a user to see a preferred language on the devices that can support that language, and see a standard language on devices that do not support the preferred language.

In another scenario, the user has provided preferences at an endpoint communication device to display a caller ID in a particular language based on caller ID information and/or based on other associated information related to the caller or calling device. For example, a user designates that the caller ID be displayed in a first language (such as Spanish) in response to receiving a call request from any family members designated by the user in preferences. An incoming call request from a family member can be identified by comparing the stored preferences to the name, address, calling phone number, and/or other caller identification information received from the calling device. The user also designates that the caller ID be displayed in a second language (such as English) in response to receiving a call request from any co-workers at the user's company, as determined from received caller ID information in the call request indicating the call request is being sent from a company phone or a company location. Other embodiments can select the displayed language based on a caller's location as determined from location data in the call request, or other characteristics of the caller. The endpoint device can determine which caller ID language to display, or in other embodiments a call processing device can determine the language.

The present disclosure describes several advantages including supporting transmitting caller identification information in multiple languages. Caller ID information can be provided to multiple communication devices connected together in a call environment, such as a forked configuration, and enabling the caller identification information to be output in user-preferred languages at each communication device receiving a call invitation. This allows more convenient and flexible use of caller identification information than in previous implementations in which, for example, caller identification data could only be provided in a single language to all callers or was otherwise limited in language selection or display flexibility.

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

While certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A method for providing call information to communication devices, the method comprising:

receiving a call request from a sending endpoint communication device connected to a network, wherein the call request is a request to initiate a call and designates one or more requested receiving endpoint communication devices that are to receive the call request;

examining alias information associated with at least one of the one or more receiving endpoint communication devices, the alias information stored separately from the call request, wherein the alias information indicates one or more additional receiving endpoint communication devices which are not designated in the call request;

obtaining caller identification information associated with the call request, wherein the caller identification information includes a plurality of caller identifications associated with the sending endpoint communication device, each caller identification specifying the same information in a different language; and transmitting the call request and the plurality of caller identifications over the network to be received by a plurality of receiving endpoint communication devices connected to the network including the one or more requested receiving endpoint communication devices and the one or more additional receiving endpoint communication devices, wherein each of the plurality of receiving endpoint communication devices receives:

the call request, and at least one of the identifications, wherein the received at least one identification is specified in a language designated for use by that receiving endpoint communication device, such that each of the plurality of receiving endpoint communication devices outputs at least one of the received identifications specified in the language designated for use by that receiving endpoint communication device.

2. The method of claim 1 wherein the alias information includes at least one receiver language indicator associated with each of the one or more additional receiving endpoint communication devices, wherein the at least one receiver language indicator indicates at least one language designated for use by the additional receiving endpoint communication devices, and wherein the different languages include the at least one language indicated by the at least one receiver language indicator.

3. The method of claim 1 wherein the call request designates one or more recipient addresses of the one or more requested receiving endpoint communication devices that are to receive the call request, and wherein the alias information is associated with at least one of the one or more recipient addresses.

* * * * *